US012809385B2

(12) United States Patent
Baddam et al.

(10) Patent No.: US 12,809,385 B2
(45) Date of Patent: Nov. 24, 2026

(54) SYSTEM AND METHOD FOR LEARNING SENSOR MEASUREMENT UNCERTAINTY

(71) Applicant: Robert Bosch GmbH, Stuttgart (DE)

(72) Inventors: Sandeep Reddy Baddam, Pittsburgh, PA (US); Jonathan Francis, Pittsburgh, PA (US); Sirajum Munir, Pittsburgh, PA (US); Sushanta Rakshit, Milpitas, CA (US); Martin Coors, Mountain View, CA (US); Samarjit Das, Wexford, PA (US); Vivek Jain, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 321 days.

(21) Appl. No.: 18/401,248

(22) Filed: Dec. 29, 2023

(65) Prior Publication Data

US 2025/0216851 A1 Jul. 3, 2025

(51) Int. Cl.
*G05D 1/242* (2024.01)
*B60W 50/00* (2006.01)
(Continued)

(52) U.S. Cl.
CPC ....... *G05D 1/2424* (2024.01); *B60W 50/0097* (2013.01); *G01C 21/12* (2013.01);
(Continued)

(58) Field of Classification Search
CPC ...... G05D 1/2424; G05D 1/242; G05D 1/245; B60W 50/0097; B60W 2556/20;
(Continued)

(56) References Cited

U.S. PATENT DOCUMENTS 9,743,239 B1 * 8/2017 Mishra .................. H04W 4/023
12,092,467 B1 * 9/2024 Ebrahimi Afrouzi .. G01C 21/32
(Continued)

FOREIGN PATENT DOCUMENTS

WO WO-2007132859 A1 * 11/2007 ............ B60W 10/18

OTHER PUBLICATIONS

Translation of WO-2007132859-A1, 14 pages (Year: 2007).*
(Continued)

*Primary Examiner* — Dale W Hilgendorf
(74) *Attorney, Agent, or Firm* — Kathy Takeguchi; Maginot, Moore & Beck LLP

(57) ABSTRACT

A computer-implemented system and method include generating a set of state data using sensor data of a particular sensor modality at a set of locations in a region. Each state data includes a corresponding position estimate of a vehicle. A set of contour ranges is generated. Each contour range is indicative of a respective error range of given state data with respect to corresponding ground truth data for a given location. The region is categorized into at least (i) a first confident level associated with a first error range and (ii) a second confident level associated with a second error range. A first confident zone corresponds to locations associated with the first confident level. A second confident zone corresponds to locations associated with the second confident level. A confident zone map includes at least the first confident zone and the second confident zone.

13 Claims, 8 Drawing Sheets

(51) Int. Cl.

*G01C 21/00* (2006.01)
*G01C 21/12* (2006.01)
*G01C 21/16* (2006.01)
*G05D 1/245* (2024.01)
*G06V 20/56* (2022.01)

(52) U.S. Cl.

CPC ....... *G01C 21/188* (2020.08); *G01C 21/3804* (2020.08); *G05D 1/242* (2024.01); *G05D 1/245* (2024.01); *B60W 2556/20* (2020.02); *G06V 20/56* (2022.01)

(58) Field of Classification Search

CPC .. G01C 21/12; G01C 21/188; G01C 21/3804; G06V 20/56

See application file for complete search history.

(56) References Cited

U.S. PATENT DOCUMENTS

| | | | | |
|---|---|---|---|---|
| 2015/0071356 | A1* | 3/2015 | Kim | H04N 19/51 375/240.16 |
| 2017/0280129 | A1* | 9/2017 | Mirota | H04N 13/257 |
| 2020/0019792 | A1* | 1/2020 | Sano | G06T 7/70 |
| 2020/0082219 | A1* | 3/2020 | Li | G01S 7/417 |
| 2020/0124421 | A1* | 4/2020 | Kang | G01S 17/06 |
| 2021/0072030 | A1* | 3/2021 | Nakashima | G06V 20/56 |
| 2021/0241026 | A1* | 8/2021 | Deng | G01S 7/497 |
| 2022/0161815 | A1* | 5/2022 | Van Beek | B60W 40/09 |
| 2022/0300757 | A1* | 9/2022 | Tsuruyama | G06V 20/56 |
| 2024/0114542 | A1* | 4/2024 | Jain | H04W 72/51 |

OTHER PUBLICATIONS

Simon,"Optimal State Estimation: Kalman, H∞, and Nonlinear Approaches," Online ISBN: 9780470045343, DOI: 10.1002/0470045345, Jan. 17, 2006.

Bar-Shalom et al., "Estimation with Applications to Tracking and Navigation: Theory, Algorithms and Software," Online ISBN: 9780471221272, DOI: 10.1002/0471221279, Jan. 4, 2002.

Maybeck et al., "Stochastic Models, Estimation, and Control, vol. I," IEEE Transactions on Systems, Man, and Cybernetics, vol. SMC-10, No. 5, May 1980, p. 282.

Papadopoulos et al., "Uncertainty estimation and Monte Carlo simulation method," Flow Measurement and Instrumentation 12 (2001), pp. 291-298.

Van Der Veen et al., "Getting started with uncertainty evaluation using the Monte Carlo method in R," https://doi.org/10.1007/s00769-021-01469-5, Accreditation and Quality Assurance, Jun. 6, 2021, pp. 129-141.

Laurens et al., "Covariance matrix uncertainty analysis and correction," 68th International Astronautical Congress (IAC), Adelaide, Australia, Sep. 25-29, 2017, pp. 1-7.

* cited by examiner

REFERENCE EXAMPLE

SYSTEM AND METHOD FOR LEARNING SENSOR MEASUREMENT UNCERTAINTY

GOVERNMENT RIGHTS

At least one or more portions of this invention may have been made with government support under U.S. Government Contract No. 80LARC21C0013, awarded by National Aeronautics and Space Administration (NASA). The U.S. Government may therefore have certain rights in this invention.

REFERENCE TO RELATED APPLICATIONS

The present application is related to the following patent applications: U.S. patent application Ser. No. 18/401,272 (R409654 (1576-3044H), filed on Dec. 29, 2023) and U.S. patent application Ser. No. 18/401,254 R410671 (1576-3043H), filed on Dec. 29, 2023), which are both incorporated by reference in their entireties herein.

TECHNICAL FIELD

This disclosure relates generally to mobile robots, and more particularly to managing and learning the reliability of various sensor measurements of mobile robots at various locations in relation to reference locations.

BACKGROUND

Uncertainty in robot state estimation refers to the inherent imprecision and lack of knowledge about a robot's position, orientation, and velocity in its environment. Several causes contribute to this uncertainty, including sensor limitations (e.g., noise, accuracy, etc.) and environmental complexity (e.g., dynamic obstacles, etc.), as well as the limitations in the robot's perception and localization algorithms. Additionally, uncertainty may arise due to unmodeled physical effects, calibration errors, and incomplete or delayed data processing.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method includes generating a set of state data with respect to a reference location using sensor data taken by a set of sensors at a set of locations in a region. The set of sensors include one or more sensors of a particular sensor modality. Each state data includes a corresponding position estimate of a vehicle carrying the set of sensors. The method includes generating a set of contour ranges using the set of state data. Each contour range is indicative of a respective error range of given state data with respect to corresponding ground truth data for a given location. The method includes categorizing the region into a plurality of confident levels using the set of contour ranges. The plurality of confident levels include at least (i) a first confident level associated with a first error range and (ii) a second confident level associated with a second error range. The first error range is greater than the second error range. The method includes creating confident zones using the plurality of confident levels. The confident zones include at least (i) a first confident zone corresponding to a first subset of locations associated with the first confident level and (ii) a second confident zone corresponding to a second subset of locations associated with the second confident level. The method includes generating a confident zone map for the region. The confident zone map includes at least the first confident zone and the second confident zone.

According to at least one aspect, a system includes one or more processors and one or more memory. The one or more memory are in data communication with the one or more processors. The one or more memory have computer readable data stored thereon. The computer readable data include instructions that, when executed by the one or more processors, performs a method. The method includes generating a set of state data with respect to a reference location using sensor data taken by a set of sensors at a set of locations in a region. The set of sensors include one or more sensors of a particular sensor modality. Each state data includes a corresponding position estimate of a vehicle carrying the set of sensors. The method includes generating a set of contour ranges using the set of state data. Each contour range is indicative of a respective error range of given state data with respect to corresponding ground truth data for a given location. The method includes categorizing the region into a plurality of confident levels using the set of contour ranges. The plurality of confident levels include at least (i) a first confident level associated with a first error range and (ii) a second confident level associated with a second error range. The first error range is greater than the second error range. The method includes creating confident zones using the plurality of confident levels. The confident zones include at least (i) a first confident zone corresponding to a first subset of locations associated with the first confident level and (ii) a second confident zone corresponding to a second subset of locations associated with the second confident level. The method includes generating a confident zone map for the region. The confident zone map includes at least the first confident zone and the second confident zone.

According to at least one aspect, one or more non-transitory computer-readable media have computer readable data stored thereon. The computer readable data include instructions that, when executed by one or more processors, cause the one or more processors to perform a method. The method includes generating a set of state data with respect to a reference location using sensor data taken by a set of sensors at a set of locations in a region. The set of sensors include one or more sensors of a particular sensor modality. Each state data includes a corresponding position estimate of a vehicle carrying the set of sensors. The method includes generating a set of contour ranges using the set of state data. Each contour range is indicative of a respective error range of given state data with respect to corresponding ground truth data for a given location. The method includes categorizing the region into a plurality of confident levels using the set of contour ranges. The plurality of confident levels include at least (i) a first confident level associated with a first error range and (ii) a second confident level associated with a second error range. The first error range is greater than the second error range. The method includes creating confident zones using the plurality of confident levels. The confident zones include at least (i) a first confident zone corresponding to a first subset of locations associated with the first confident level and (ii) a second confident zone corresponding to a second subset of locations associated with the second confident level. The method includes generating a confident zone map for the region. The confident zone map includes at least the first confident zone and the second confident zone.

These and other features, aspects, and advantages of the present invention are discussed in the following detailed description in accordance with the accompanying drawings throughout which like characters represent similar or like parts. Furthermore, the drawings are not necessarily to scale, as some features could be exaggerated or minimized to show details of particular components.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

This disclosure relates to settings where satellite-based navigation systems, such as global positioning system (GPS), is unreliable or unavailable. For example, this disclosure relates to extraterrestrial and space deployments, such as lunar rovers or Mars rovers. This disclosure also relates to outdoor applications on Earth where GPS is unreliable and/or unavailable. In addition, this disclosure relates to indoor applications on Earth such as inside a garage, a warehouse, or a home, etc. As a non-limiting example, in some embodiments, this disclosure considers the example use-case of a mobile robot (e.g., a rover) that must perform smart-docking maneuvers on the surface of the moon. In this use-case, the mobile robot is initialized with a rough state estimate, some distance away from a stationary charging coil, and must autonomously perform precise navigation to and docking with the charging coil, despite the possible existence of negative environmental factors (e.g., low-light conditions, high glare/reflectivity on the fiducial marker, lunar dust obscuring part of the rover's camera lens, etc.).

Figure 1:
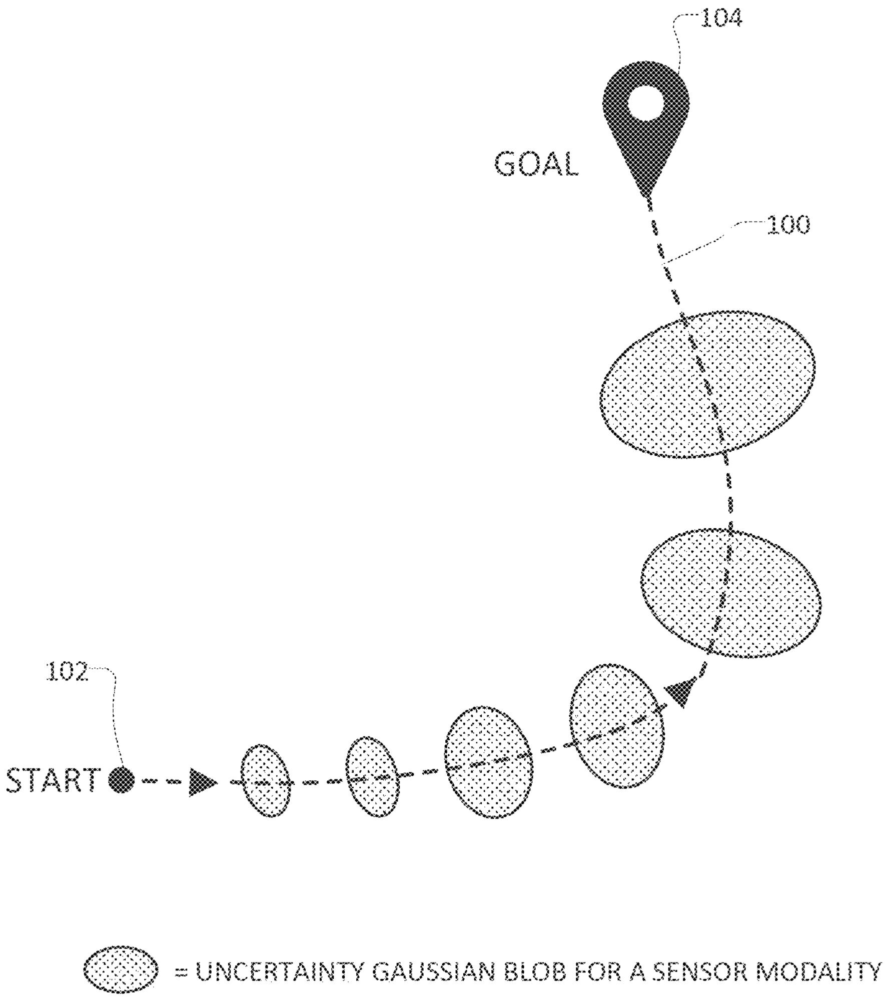
FIG. 1 is a diagram of a reference example that shows the error associated with a dead-reckoning sensor modality with respect to time and distance according to an example embodiment of this disclosure.

FIG. 1 is a diagram of a reference example that illustrates a path 100 of travel of a mobile robot according to one or more sensors of a dead-reckoning modality type according to an example embodiment. In general, a sensor of dead-reckoning modality type refers to a sensor that uses previous sensor data to determine current sensor data. As a non-limiting examples, this type of sensor may include a wheel odometry sensor, a visual odometry sensor, an inertial sensor, etc. This type of sensor is thus subject to cumulative errors.

As a reference example, FIG. 1 illustrates the path 100 from a source location 102 to a destination location 104 (e.g., a goal or a docking station location). In addition, FIG. 1 illustrates elliptical shapes along the path 100. Each elliptical shape represents an uncertainty Gaussian blob associated with its one or more sensors of dead-reckoning modality type. As shown in FIG. 1, while traveling from the source location 102 to the destination location 104, the mobile robot experiences error accumulation as its travel distance and travel time increases. In this regard, each elliptical shape (i.e., an uncertainty Gaussian blob) increases in size from the source location 102 to the destination location 104. In this example, the sensor measurement maps to two-dimensional space. Thus, each uncertainty blob is represented as an ellipse or a contour plot to show the likely range that encompasses the true value. Each contour plot provides an error margin for each (x,y) location of this dead-reckoning modality type. In this regard, FIG. 1 shows that the error in state estimation accumulates with increasing time of operation or long-time operations.

Although FIG. 1 illustrates a sensor modality of dead-reckoning type that is prone to error accumulation over time and distance, there are a number of other sensor modalities (e.g., GPS, LIDAR, camera with fiducial markers/tags, etc.), which are not prone to drifting. However, each of these modalities may be confident in some locations and/or certain times, but not in other locations and/or other times. For example, the camera may be very certain when the lighting conditions are good and there is no image noise, but this modality may be less reliable when dirt is covering the camera lens or in cluttered situations where occlusion is likely to happen. Conversely, another modality involving wireless communication signals is not impacted by low-light conditions but may be less accurate for precise localization. Thus, one or more modalities may be more or less reliable in certain regions, depending on the terrain. Accordingly, the system 200 is configured to make the mobile robot 300 aware of zones, where each sensor modality is confident so that the mobile robot 300 is configured to perform state estimation precisely, generate state data that includes a position estimate, and perform informed decision making.

Figure 2:
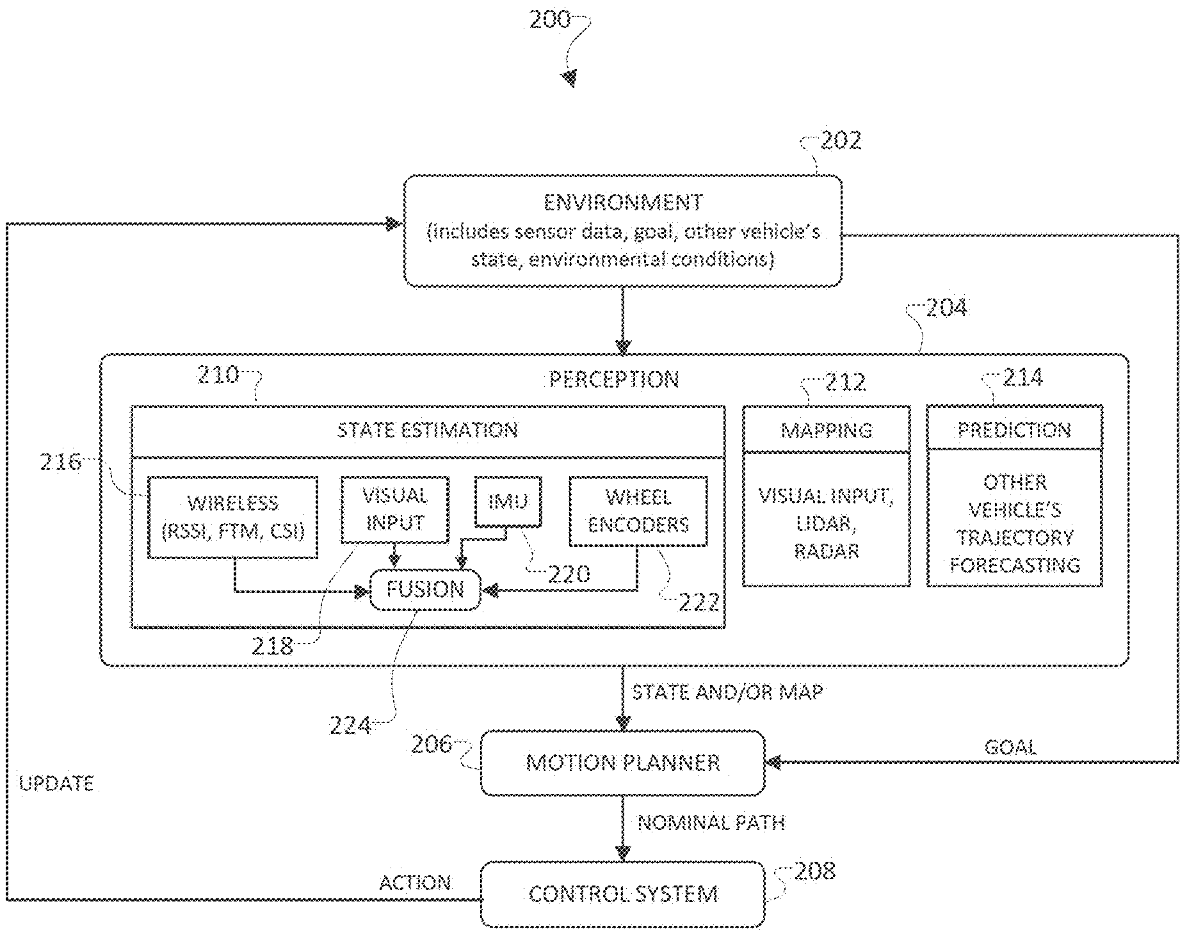
FIG. 2 is a flow diagram of an example of a process of the system according to an example embodiment of this disclosure.

FIG. 2 is a diagram that illustrates an example of a flow of information of the system 200 according to an example embodiment. The system 200 includes a set of modules. For example, the system 200 includes an environment module 202, a perception module 204, a motion planner 206, and a control system 208. The system 200 may include more modules or less modules than the number of modules illustrated in FIG. 2 provided that the set of modules perform at least the same or similar functions as described herein.

The environment module 202 is configured to receive and/or obtain environment data from an environment of the mobile robot 300. The environment data includes sensor data obtained via one or more sensors of the mobile robot 300, a state of the mobile robot 300, a goal (e.g., reference location, target location, or docking station location) of the mobile robot 300, environmental conditions (e.g., weather, temperature, etc.) of the environment of the mobile robot, etc. Upon obtaining this environment data relating to a current environment of the mobile robot 300, the environment module 202 transmits this environment data to the perception module 204.

The perception module 204 is configured to receive environment data from the environment module 202. The perception module 204 is configured to generate perception data using the sensor data. In the example shown in FIG. 2, the perception module 204 includes a state estimation module 210, a mapping module 212, and a prediction module 214.

The state estimation module 210 is configured to perform state estimation and generate state data, which include a position estimate of the mobile robot. The state estimation module 210 includes a set of sensor modules. Each sensor module corresponds to a particular sensor modality. For example, in FIG. 2, the state estimation module 210 includes a wireless module 216, a visual input module 218, an inertial measurement unit (IMU) module 220, and a wheel encoder module 222. In addition, the state estimation module 210 includes a fusion module 224, which is configured to fuse state estimation data and/or other related data received from a number of the sensor modules.

The wireless module 216 is configured to perform state estimation using wireless features. For example, the wireless module 216 is configured to extract wireless features obtained from one or more wireless sensors and generate state data including a position estimate using one or more of these wireless features. The wireless features may include received signal strength (RSSI) data, fine tune measurement (FTM) data, channel state information (CSI) data, other wireless attributes, or any combination thereof.

The visual input module 218 includes fiducial tag-base state estimation. Fiducial tags are also known as visual markers, which are specially designed patterns or symbols placed in the environment to provide reference points for robot perception systems. These tags are typically designed to be easily detectable and distinguishable by cameras, thereby allowing robots to accurately recognize their position and orientation relative to the tags. Fiducial tags come in various forms, such as QR codes, barcodes, specialized marker patterns like April Tags, etc.

A process for fiducial tag-based state estimation involves (1) detection, (2) recognition, (3) pose estimation, and (4) iteration. With respect to the first step of detection, the process includes capturing images, via a camera of the mobile robot, of the environment and performing image processing techniques (e.g., thresholding, edge detection, etc.) to identify the fiducial tags present in the scene. With respect to the second step of recognition, the process includes matching the detected fiducial tags against a known library of tag patterns to identify their unique IDs. With respect to the third step of pose estimation, the process includes using the known properties of the fiducial tags, such as their size and shape, along the detected image coordinates. A program calculates the pose (i.e., position and orientation) of each tag relative to the camera. With respect to the iteration step, this process is repeated over time as new images are captured, allowing for continuous updating of the robot's state estimation based on the detection and recognition of fiducial tags in the scene.

The visual input modality is used besides wheel odometry because, with skid-steer configuration, the robot turning rate is a function of both wheel velocities and skidding rate. As wheel odometry does not consider skidding, the corresponding state estimates are inaccurate. Thus, the fiducial tag-based modality may provide better state estimates that may be used in planning and control.

The IMU module 220 is configured to generate state estimation data using inertial measurement units. The IMU module 220 is configured to generate a position estimate using IMU data from one or more IMU sensors, which may include an accelerometer, a gyroscope, a magnetometer, etc.

The wheel encoder module 222 is configured to generate state estimation data using information obtained from wheels of the mobile robot. For instance, in an example, the mobile robot may comprise a four wheeled skid-steer configuration robot. The wheel encoders therefore comprise rotary encoders, which track motor shaft rotation to generate position and motion information based on wheel movement. The wheel encoder module 222 is therefore configured to generate state estimation data from wheel encoders and/or wheel odometry.

Also, as shown in FIG. 2, the perception module 204 includes the mapping module 212 and the prediction module 214. The mapping module 212 is configured to perform mapping actions relating to one or more sensors. For example, the mapping module 212 is configured to generate a map or perform mapping with respect to visual input, LIDAR, RADAR, etc. The prediction module 214 is configured to generate prediction data. As an example, the prediction data may relate to at least one other vehicle's trajectory forecasting and/or at least one other robot's trajectory forecasting. The mapping module 212 and the prediction module 214 are advantageous in ensuring that the system 200 is configured to navigate around its surroundings in an efficient and reliable manner without collision (e.g., colliding with another vehicle, another robot, another object, etc.).

As aforementioned, the perception module 204 is configured to generate perception data. The perception data includes state data (e.g. position estimate), a set of confident zone maps, and a unified confident zone map, or any combination thereof. The state data includes a position estimate such as (x, y, θ), where x and y are cartesian position coordinates of the mobile robot and where θ is an orientation of the robot. Also, the perception module 204 includes known sensor models (i.e., mathematical models that describes the relation between the actual sensor output and the robot state in global frame) for all the sensor modalities. In addition, the perception module 204 is configured to transmit the perception data to the motion planner 206. The perception module 204 is also configured to transmit (i) the mapping data from the mapping module 212 and/or (ii) prediction data from the prediction module 214, to the motion planner 206.

The motion planner 206 is configured to receive perception data from the perception module 204 and environment data from the environment module 202. The motion planner 206 is also configured to receive mapping data from the mapping module 212 and prediction data from the prediction module 214. The motion planner 206 is configured to generate motion planning data using the perception data and the environment data. The motion planning data includes a nominal path for the mobile robot. The motion planning data includes control commands with a plan for the mobile robot. The control commands specify a linear velocity of the mobile robot and an angular velocity of the mobile robot. The motion planner 206 is configured to transmit the motion planning data to the control system 208.

The control system 208 is configured to receive motion planning data from the motion planner 206. For example, the motion planning data includes a nominal path for the control system 208 and/or control commands to control a movement of the mobile robot. In response to receiving the motion planning data, the control system 208 is configured to transmit a control signal and/or perform an action that advances the mobile robot according to the nominal path and/or the control commands. In addition, the control system 208 is configured to update the environment module 202.

Figure 3:
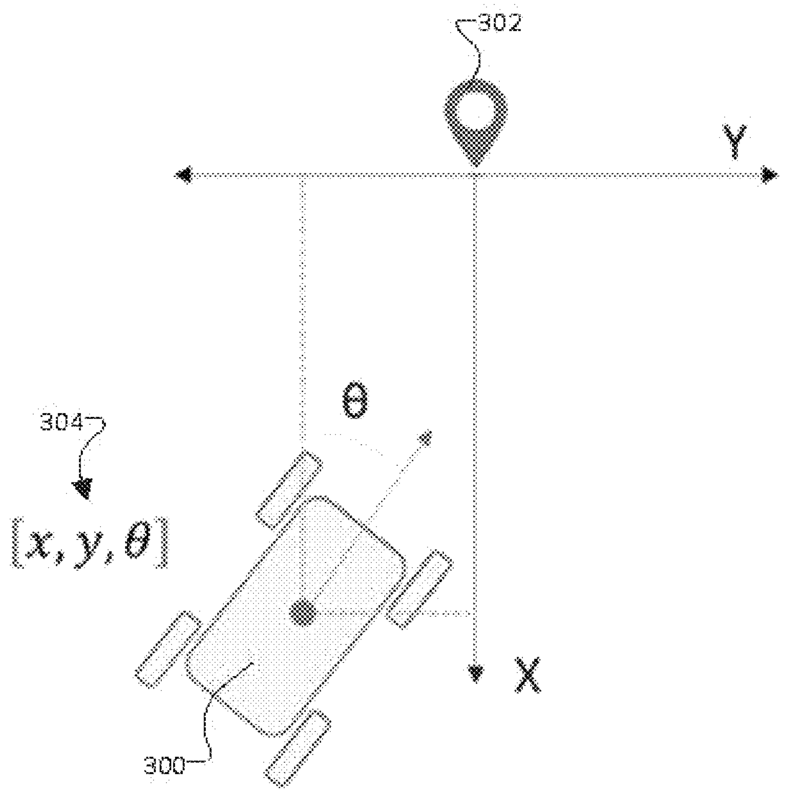
FIG. 3 is a diagram of an example of a state of a mobile robot according to an example embodiment of this disclosure.

FIG. 3 is a diagram that illustrates a representation of a state of a mobile robot 300 according to an example embodiment. In this example, the state data 304 of the mobile robot 300 is given by (x, y, θ), where x and y are cartesian position coordinates of the mobile robot and where θ is an orientation of the mobile robot. In this case, x, y, and θ are relative to some reference location 302 (e.g., a target location, a goal, etc.). As an example, the reference location 302 refers to a location of a docking station of the mobile robot 300. In this regard, FIG. 3 illustrates the mobile robot 300 in relation to these parameters.

Precise navigation requires accurate and robust state estimation, coupled with effective path-planning and control strategies. The system 200 (e.g., the motion planner) receives the state data 304, represented as (x,y,θ), as input data and is configured to generate control commands, (linear velocity, angular velocity), as output data.

FIG. 4, FIG. 5, FIG. 6, and FIG. 7 illustrate various aspects relating to a process of generating a unified confident zone map that leverages confidence levels of a set of sensor modalities for a particular spatial region. As an overview, the process includes attaining confident zones and performing online uncertainty learning, as discussed below. The attainment of confident zones includes (i) estimating uncertainty blobs, (ii) mapping a region into confident zones, and (iii) generating a unified confident zone map, as described below. The unified confident zone map is advantageous in mapping the confidence levels of sensor modalities for the region for the motion planner 206 to guide the mobile robot 300.

I. Attainment of Confident Zones (i) Estimating Uncertainty Blobs

The uncertainty estimation is performed for all the onboard sensors either on only intended paths of travel or entire traversability space. As an example, the process of generating an uncertainty blob from a sensor measurement includes the following steps. The steps are enumerated for ease of reference and discussion, but they may be carried out in any logical manner. The process is not limited to these steps, but may include more steps or less steps.

At a first step, according to an example, the process includes understanding the sensor modality. Different sensor modalities have different characteristics and statistical properties. The process therefore includes gaining an understanding of the sensor's operating principles, limitations, and error sources.

As a second step, according to an example, the process includes sensor calibration and accuracy assessment. In this regard, the process includes verifying that the sensor is properly calibrated, and its accuracy meets the required specifications.

As a third step, according to an example, the process includes analyzing sensor noise characteristics. The process includes determining the statistical properties of the sensor noise. This includes assessing whether the noise is Gaussian, estimating the noise variance, and evaluating any correlations or dependencies in the noise.

As a fourth step, according to an example, the process includes estimating error ranges. The process includes conducting experiments to evaluate the sensor's performance in controlled conditions. These tests involve comparing the sensors' measurements with ground truth data i.e., computing distance difference between measured and actual robot locations. This variability of the measurement is referred to as error range.

As a fifth step, according to an example, the process includes applying statistical methods to find the uncertainty blob. For instance, in the case of Gaussian approximation, the process includes calculating the mean and the standard deviation of the error ranges obtained from the fourth step to obtain the Gaussian error blob (e.g., 2D Gaussian error blob) around the state estimate. Depending on the sensor modality and the nature of the uncertainty, the process may employ various statistical methods (e.g., Gaussian approximation, Bayesian inference, Monte Carlo simulations, and Residual analysis) on the error ranges to determine these uncertainty blobs. As an example, for instance, when the sensor measurement uncertainty is Gaussian, then the resultant blobs comprise a Gaussian mixture. Also, in this example, the uncertainty is quantified in distance units.

(ii) Mapping Space into Confident Zones

A confident zone is the spatial area that spans the locations where state estimates have the same uncertainty range in the values. For a given space, each modality can have different confident zones depending on the magnitudes of measurement errors. For example, with respect to the visual modality (which involves detecting and extracting information from the fiducial tags), a high confident region is where the mobile robot's onboard camera can easily obtain the entire fiducial tag in its field-of-view and estimate the mobile robot's state accurately. As another example, for the wheel encoder modality, a high confident region corresponds to traveling in a straight line to the goal. After the uncertainty blobs (or error margins) are generated for a sensor modality, then the space is categorized into different confident zones.

Figure 4:
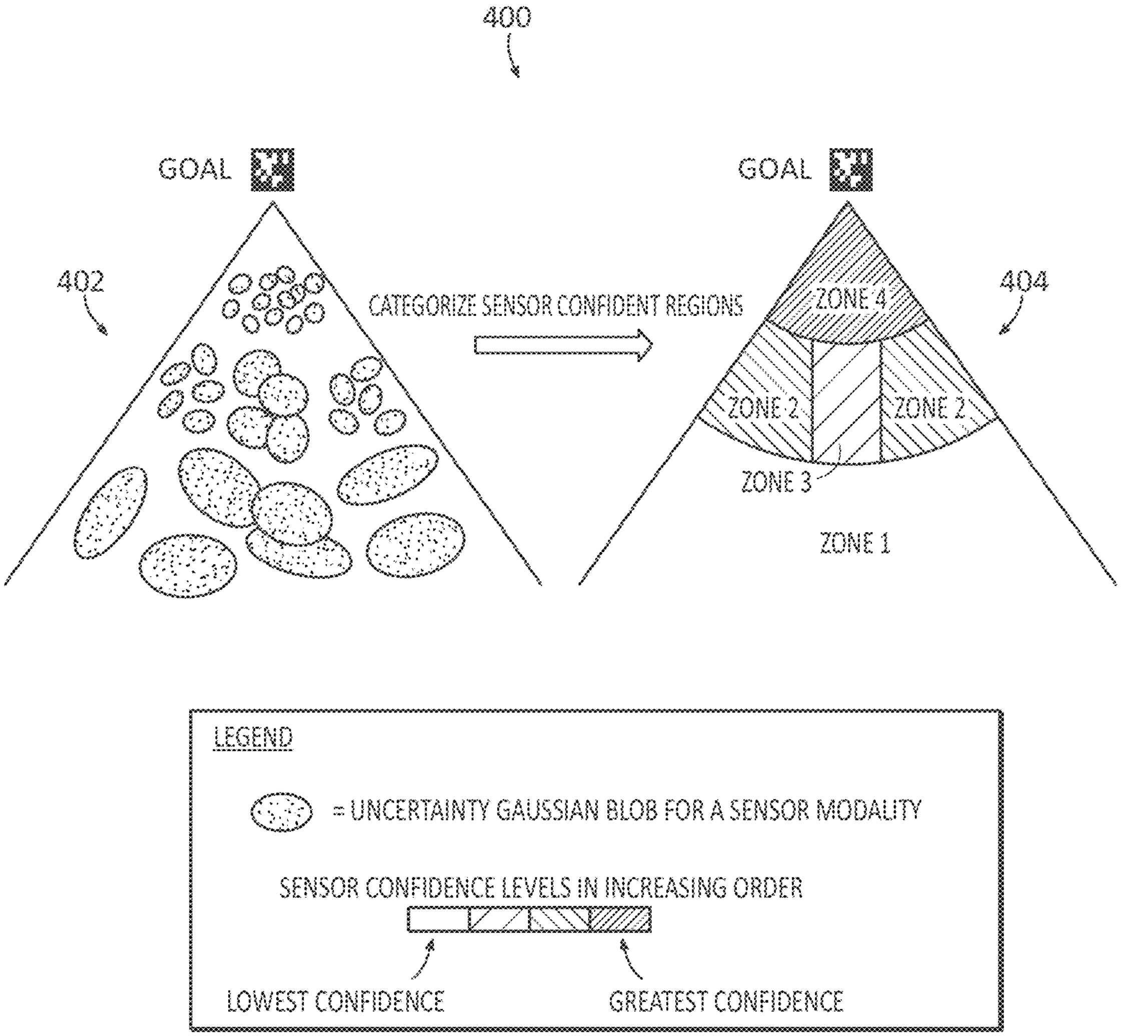
FIG. 4 is a diagram that shows a visualization of a mapping of uncertainty blobs into confident zones according to an example embodiment of this disclosure.

FIG. 4 is a visualization 400 of an example of a mapping the uncertainty blobs of a space into different confident zones according to an example embodiment. More specifically, FIG. 4 illustrates an example involving camera modality, particularly a fiducial tag-based method on cone of interest. The first spatial representation 402 shows various uncertainty blobs in the sensing region with respect to the goal (e.g., reference location or docking station location. In this example, the sensor measurement maps to two-dimensional space. Thus, each uncertainty blob is represented as an ellipse or a contour plot to show the likely range that encompasses the true value. Each contour plot provides an error margin for each (x,y) location. In this example, a larger size of an uncertainty blob corresponds to greater uncertainty and a smaller confidence level of that sensor modality.

In the first spatial representation 402, the uncertainty blobs indicate that there is greater certainty and confidence levels near the goal. Meanwhile, the second spatial representation 404 shows a categorization of the uncertainty blobs shown in the first spatial representation 402. The second spatial representation 404 indicates that the cone of interest may be divided into four zones. In this example, the second spatial representation 404 includes (i) a first zone that has a lowest confidence level for camera modality, (ii) a third zone that has a greater confidence level for camera modality than the first zone, (iii) a second zone that has a greater confidence level for camera modality than the third zone, and (iv) a fourth zone that has a greater confidence level for camera modality than the second zone, as indicated by the different color gradients in the legend.

In general, the categorization of the uncertainty blobs may be performed using any logic-based filter with a certain maximum threshold. The categorization may use clustering or decision trees. Also, there may be many different levels of quantified confident zones for a modality. FIG. 4 shows different levels of quantified confident zones with different blue color gradients. A same process or a similar process may be performed for all onboard sensor modalities to generate corresponding confident zone maps.

Figure 5:
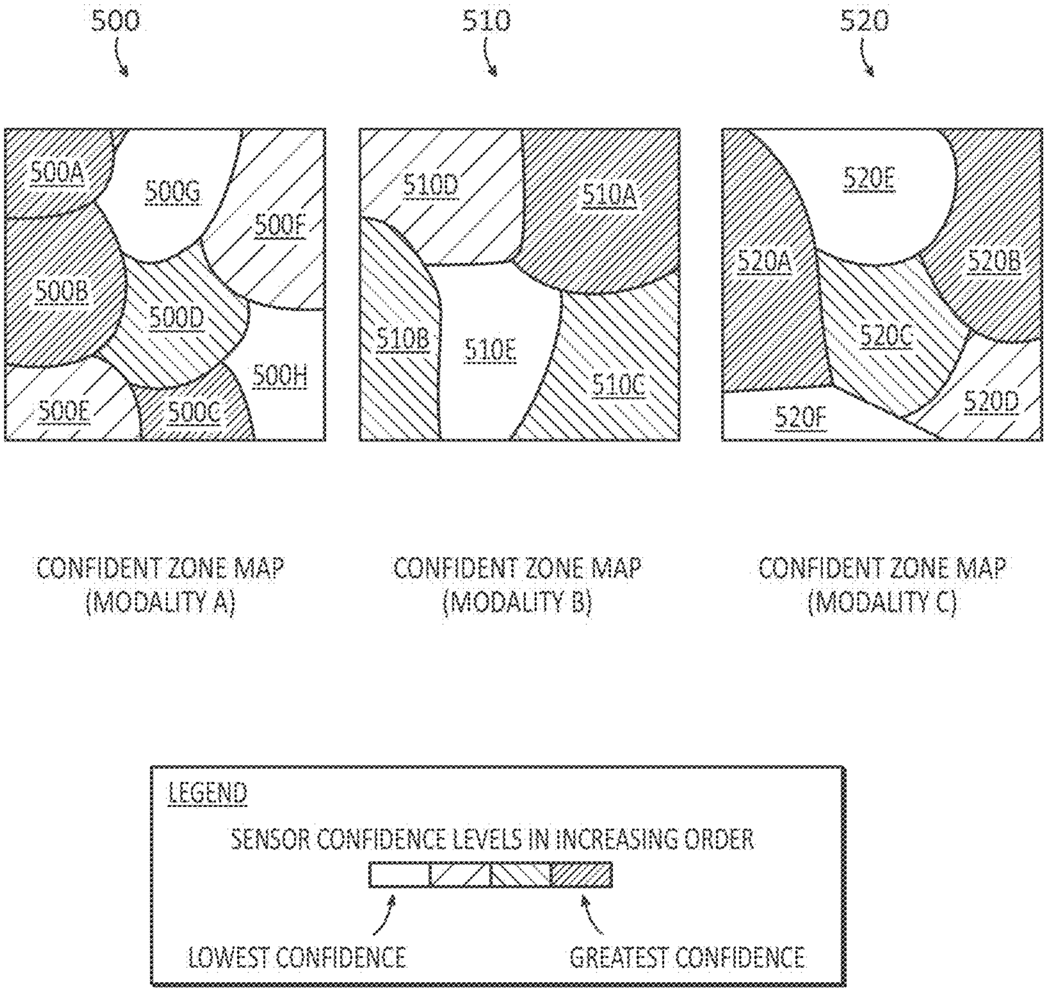
FIG. 5 is a diagram that illustrates examples of different confident zone maps of different modalities according to an example embodiment of this disclosure.

FIG. 5 illustrates examples of the attainment of sensor confident zones in the spatial domain for different sensor modalities according to an example embodiment. More specifically, for example, FIG. 5 illustrates a first confident zone map 500 of a first modality ("modality A"), a second confident zone map 510 of a second modality ("modality B"), and a third confident zone map 520 of a third modality ("modality C"). Modality A, modality B, and modality C may each refer to a distinct sensor modality of the state estimation module 210. In addition, FIG. 5 shows different levels of quantified confident zones with different blue color gradients. For example, the first confident zone map 500 includes eight distinct confident zones (i.e., confident zone 500A, confident zone 500B, confident zone 500C, confident zone 500D, confident zone 500E, confident zone 500F, confident zone 500G, and confident zone 500H) of various confidence levels. The second confident zone map 510 includes five distinct confident zones (i.e., confident zone 510A, confident zone 510B, confident zone 510C, confident zone 510D, and confident zone 510E) of various confidence levels. The third confident zone map 520 includes six distinct confident zones (i.e., confident zone 520A, confident zone 520B, confident zone 520C, confident zone 520D, confident zone 520E, and confident zone 520F) of various confidence levels. Although FIG. 5 shows the application of generating confident zone maps in the spatial domain for different modalities, the generation of confident zone maps may also be extended to the temporal domain for a single modality where the sensor confident may vary with time.

As shown in FIG. 5, when mapping to the same space, the first confident zone map 500, the second confident zone map 510, and the third confident zone map 520 illustrate that there are some areas where the first sensor modality is more confident and more reliable than the second sensor modality and the third sensor modality, respectively. Also, these confident zone maps indicate that there are some areas where the second sensor modality is more confident and more reliable than the first sensor modality and the third sensor modality, respectively. In addition, these confident zone maps indicate that there are some areas where the third sensor modality is more confident and more reliable than the first sensor modality and the second sensor modality, respectively. As shown in FIG. 5, the attainment and generation of these confident zone maps may be used and leveraged by the mobile robot 300 when navigating about that space in its environment. Also, upon generating a set of confident zone maps for a set of sensor modalities, then the system 200 is configured to generate a unified confident zone map.

(iii) Generating a Unified Confident Zone Map

Figure 6:
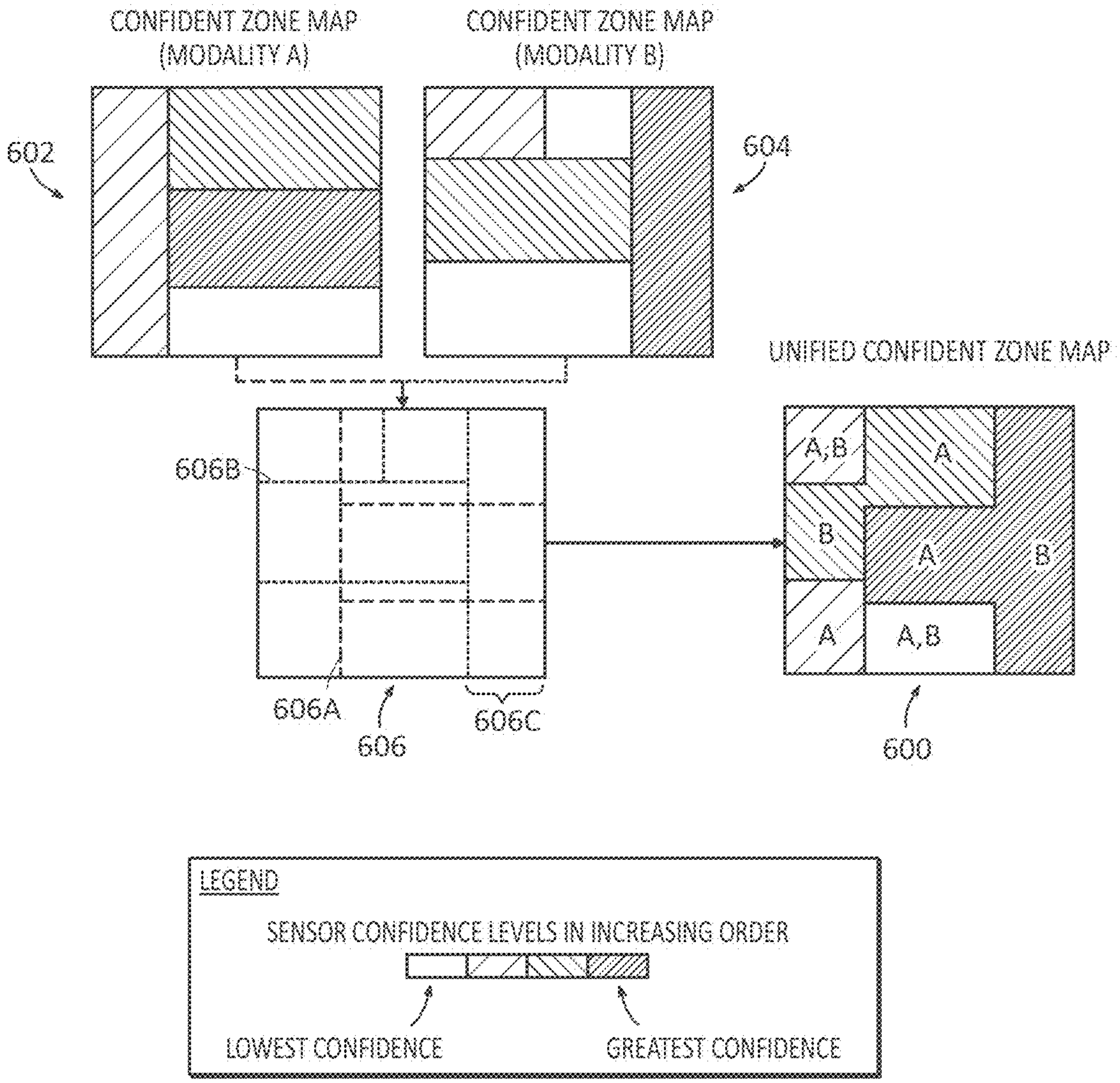
FIG. 6 is a flow diagram that illustrates aspects of generating a unified confident zone map according to an example embodiment of this disclosure.

FIG. 6 shows an example of a unified confident zone map 600, which is generated by fusing a set of confident zone maps together according to an example embodiment. More specifically, the unified confident zone map 600 is generated by selecting the best of the modalities from among the set of confident zone maps at each location in the space. More specifically, in FIG. 6, the unified confident zone map 600 is a fusion of a set of confident zone maps, which includes a first confident zone map 602 associated with a first sensor modality (denoted as "modality A") and a second confident zone map 604 associated with a second sensor modality (denoted as "modality B"). As shown in FIG. 6, the first confident zone map 602 has some areas, where the first modality has greater confidence and greater reliability than the second modality. Also, the second confident zone map 604 has some areas, where the second modality has greater confidence and greater reliability than the first modality.

FIG. 6 also shows a visualization 606 of the region with (i) the boundary data 606A of the confident zones of the first confident zone map 602A, associated with the first sensor modality ("modality A"), and (ii) the boundary data 606B of the confident zones of the second confident zone map 604, associated with the second sensor modality ("modality B"). The boundary data 606A and the boundary data 606B create new confident zones. Each new confident zone is assigned a greatest confidence level and a corresponding best modality from among the first confident zone map 602 and the second confident zone map 604. For example, the new confident zones that form a rightmost region 606C of the visualization 606 is assigned the second highest confidence level as indicated in the second confident zone map 604 and also assigned the second sensor modality ("modality B") since the second sensor modality has a greater confidence level than the first sensor modality for those new confident zones of that rightmost region 606C.

Figure 7:
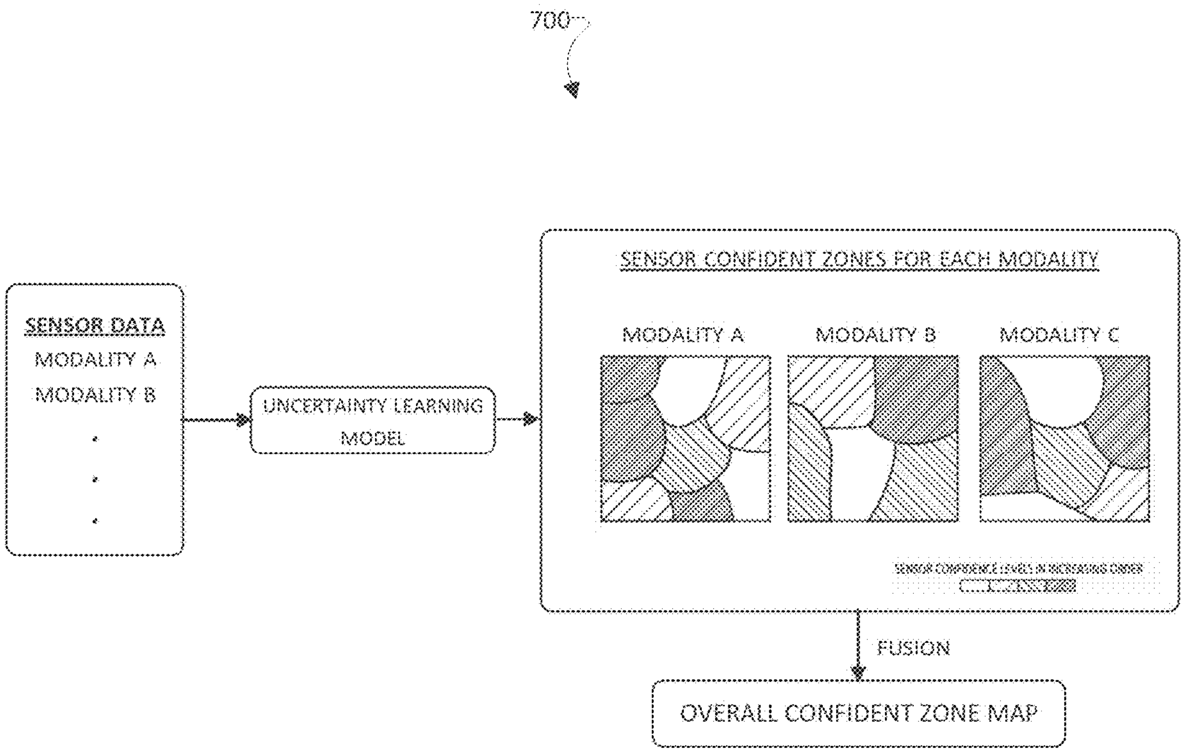
FIG. 7 is a flow diagram that illustrates a process of generating a unified confident zone map according to an example embodiment of this disclosure.

FIG. 7 shows an example of a process 700 for generating a unified confident zone map according to an example embodiment. More specifically, in FIG. 7, the process 700 includes an uncertainty learning model, which receives sensor data from a set of sensor modalities and which generates a corresponding set of confident zone maps. As an example, the uncertainty learning model may include at least one machine learning model. In addition, the process 700 includes generating a unified confident zone map by fusing the set of confident zone maps, as discussed above. Upon generating the unified confident zone map, the perception module 204 is configured to transmit this unified confident zone map to the motion planner 206. The motion planner 206 is then configured to generate a nominal path for controlling the control system 208 of the mobile robot 300.

II. Online Uncertainty Learning

Furthermore, measurement uncertainty, which is computed from statistical techniques, may be improved with more sensor data. Thus, the system 200 is further configured to learn uncertainty on the robot platform, in an online fashion. The system 200 performs this online learning for all onboard modalities, by considering pose values from the most confident modality at corresponding locations as ground truths. These ground truth pose values may also be from other accurate sensor modalities including but not limited to motion capture systems. So, by comparing the actual sensor measurements and ground truth values at those key locations, the error range is estimated as explained in fourth step in the process of estimating uncertainty blobs. For example, if (x,y) is a position estimate from fiducial tag and (p,q) from odometry, then the error range for odometry is $(|x-p|, |y-q|)$ provided that fiducial tag modality is of higher confident compared to the odometry. For all onboard sensor models except the high confident modality, the system 200 updates the mean and variance of uncertainty blobs incrementally using Bayesian online learning, online ensemble methods, or Gaussian processes, as the new corresponding sensor data arrives in at key points. The system 200 performs this online learning in real-time.

As an example, to execute this technique in a known or an unknown environment, the system 200 is configured to make use of safe expert demonstrations. In this regard, the mobile robot 300 navigates along these predefined (e.g., expert) trajectories where a particular sensor modality works well and gives accurate state estimates (or position estimate data) for that particular sensor modality. For example, odometry works very well for straight traversals. Later, using these accurate state estimates, the mobile robot 300 updates the uncertainty in other low-confident modalities as discussed above with respect to online learning. As a result, the uncertainty values obtained in this process can be embedded in covariance matrices of Bayesian filters like Kalman Filters, Extended Kalman Filters. Thus, alternatively, the system 200 may avoid significant manual parameter tuning efforts when using filters in unknown environment.

Figure 8:
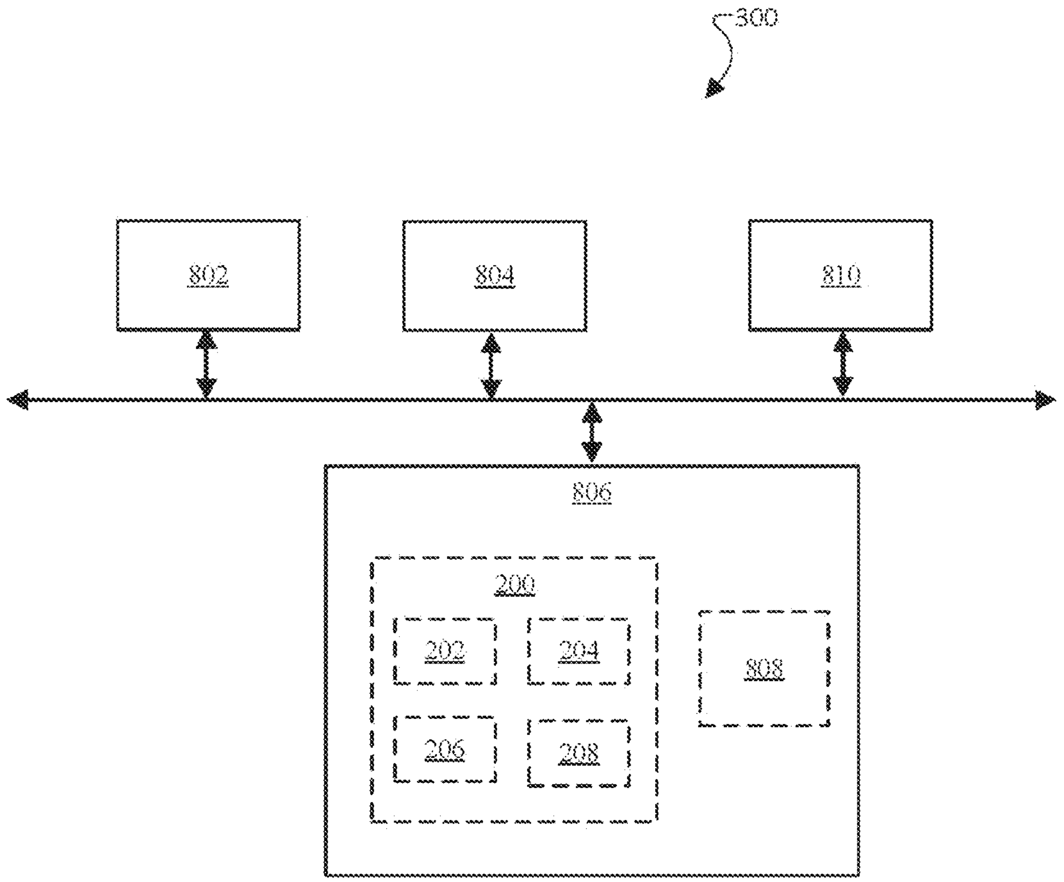
FIG. 8 is a block diagram that illustrates an example of a mobile robot according to an example embodiment of this disclosure.

FIG. 8 is a block diagram of an example of the mobile robot 300 according to an example embodiment. More specifically, the mobile robot 300 includes at least a processing system 802 with at least one processing device. For example, the processing system 802 includes at least an electronic processor, a central processing unit (CPU), a graphics processing unit (GPU), a Tensor Processing Unit (TPU), a microprocessor, a field-programmable gate array (FPGA), an application-specific integrated circuit (ASIC), any suitable processing technology, or any number and combination thereof. The processing system 802 is operable to provide the functionality as described herein.

The mobile robot 300 is configured to include at least one sensor system 804. The sensor system 804 senses the environment and generates sensor data based thereupon. The sensor system 804 is in data communication with the processing system 802. The sensor system 804 is also directly or indirectly in data communication with the memory system 806. The sensor system 804 includes a number of sensors. As aforementioned, the sensor system 804 includes various sensors of various sensor modalities. For example, the sensor system 804 includes at least an image sensor (e.g., a camera), a wireless sensor (e.g., Wi-Fi 2.4 GHz on an ESP32 wireless chip), IMU technology (e.g., accelerometer, a gyroscope, a magnetometer, etc.), a light detection and ranging (LIDAR) sensor, a radar sensor, wheel encoders, a motion capture system, any applicable sensor, or any number and combination thereof. Also, the sensor system 804 may include a thermal sensor, an ultrasonic sensor, an infrared sensor, a motion sensor, or any number and combination thereof. The sensor system 804 may include a satellite-based radio navigation sensor (e.g., GPS sensor). In this regard, the sensor system 804 includes a set of sensors that enable the mobile robot 300 to sense its environment and use that sensing information to operate effectively in its environment.

The mobile robot 300 includes a memory system 806, which is in data communication with the processing system 802. In an example embodiment, the memory system 806 includes at least one non-transitory computer readable storage medium, which is configured to store and provide access to various data to enable at least the processing system 802 to perform the operations and functionality, as disclosed herein. The memory system 806 comprises a single memory device or a plurality of memory devices. The memory system 806 may include electrical, electronic, magnetic, optical, semiconductor, electromagnetic, or any suitable storage technology that is operable with the mobile robot 300. For instance, the memory system 806 includes random access memory (RAM), read only memory (ROM), flash memory, a disk drive, a memory card, an optical storage device, a magnetic storage device, a memory module, any suitable type of memory device, or any number and combination thereof.

The memory system 806 includes at least the system 200, which includes at least the environment module 202, the perception module 204, the motion planner 206, and the control system 208. In addition, the memory system 806 includes other relevant data 808. The system 200 and the other relevant data 808 are stored on the memory system 806. The system 200 includes computer readable data. The computer readable data includes instructions. In addition, the computer readable data may include various code, various routines, various related data, any software technology, or any number and combination thereof. The instructions, which, when executed by the processing system 802, is configured to perform at least the functions described in this disclosure. Meanwhile, the other relevant data 808 provides various data (e.g., operating system, etc.), which relate to one or more components of the mobile robot 300 and enables the mobile robot 300 to perform the functions as discussed herein.

In addition, the mobile robot 300 includes other functional modules 810. For example, the other functional modules 810 include a power source (e.g., one or more batteries, etc.). The power source may be chargeable by a power supply of a docking station. The other functional modules 810 include communication technology (e.g., wired communication technology, wireless communication technology, or a combination thereof) that enables components of the mobile robot 300 to communicate with each other, communicate with one or more other communication/computer devices, or any number and combination thereof. The other functional modules 810 may include one or more I/O devices (e.g., display device, speaker device, etc.).

Also, the other functional modules 810 may include any relevant hardware, software, or combination thereof that assist with or contribute to the functioning of the mobile robot 300. For example, the other functional modules 810 include a set of actuators, as well as related actuation systems. The set of actuators include one or more actuators, which relate to enabling the mobile robot 300 to perform one or more of the actions and functions as described herein. For example, the set of actuators may include one or more actuators, which relate to driving wheels of the mobile robot 300 so that the mobile robot 300 is configured to move around its environment. The set of actuators may include one or more actuators, which relate steering the mobile robot 300. The set of actuators may include one or more actuators, which relate to a braking system that stops a movement of the wheels of the mobile robot 300. Also, the set of actuators may include one or more actuators, which relate to other actions and/or functions of the mobile robot 300. In general, the other functional modules 810 include various components of the mobile robot 300 that enable the mobile robot 300 to move around its environment, and optionally perform one or more tasks in its environment.

As described in this disclosure, the system 200 provides several advantages and benefits. For example, the system 200 is configured to use the strength of one sensor modality to learn uncertainty of at least one other sensor modality, and sometimes may use one or more sensor modalities to augment each other. This provides an opportunity to learn sensor measurement uncertainties and improve sensor models in real-time so that they can adapt to an unknown environment.

In addition, the system 200 is configured to deal with uncertainty for navigation. First, the system 200 learns sensor confident zones using the measurement uncertainty associated with each onboard sensor modality. As a result, the system 200 and the mobile robot 300 know the best of existing modalities at different locations in a space, thereby its state data is precisely estimated. The system 200 is also configured to later feed this information to the motion planner 206 for safe and precise navigation. Also, the system 200 is configured to learn uncertainty in real-time for less-confident modalities and/or improve them using high-confident modalities. The mobile robot 300 is thus enabled to adapt quickly to the environment in terms of state awareness.

Furthermore, the system 200 is configured to make more informed decisions and take appropriate actions in complex and dynamic environments by being aware of the limitations of its state estimation. In addition, the system 200 is configured to adjust its actions, plan conservatively, and implement strategies to handle unforeseen situations effectively, thereby improving safety, reliability, and overall performance. Therefore, the embodiments herein are advantageous in enabling mobile robots to estimate and mitigate sensor uncertainty, which is critical in various applications, such as various navigation applications (e.g., autonomous navigation) and manipulation tasks.

Furthermore, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally, or alternatively, components and functionality may be separated or combined differently than in the manner of the various described embodiments and may be described using different terminology. These and other variations, modifications, additions, and improvements may fall within the scope of the disclosure as defined in the claims that follow.

The invention claimed is:

1. A computer-implemented method comprising:

generating a set of state data with respect to a reference location using sensor data taken by a set of sensors at a set of locations in a region, the set of sensors including one or more sensors of a particular sensor modality, each state data including a corresponding position estimate of a vehicle carrying the set of sensors;

generating a set of contour ranges using the set of state data, each contour range being indicative of a respective error range of given state data with respect to corresponding ground truth data for a given location;

categorizing the region into a plurality of confident levels using the set of contour ranges, the plurality of confident levels including at least a first confident level associated with a first error range and a second confident level associated with a second error range, the first error range being greater than the second error range;

creating confident zones using the plurality of confident levels, the confident zones including at least a first confident zone corresponding to a first subset of locations associated with the first confident level and a second confident zone corresponding to a second subset of locations associated with the second confident level;

generating a confident zone map for the region, the confident zone map including at least the first confident zone and the second confident zone;

generating a unified confident zone map by fusing the confident zone map with one or more other confident zone maps associated with one or more other sensor modalities, the fusing including selecting a greatest confident level corresponding to a best sensor modality for a given location from among the confident zone map and the one or more other confident zone maps;

generating a control command based on the unified confident zone map; and controlling an actuator based on the control command.

2. The computer-implemented method of claim 1, further comprising:

receiving new sensor data from the set of sensors of the particular sensor modality; and updating mean and variance of the set of contour ranges using the new sensor data.

3. The computer-implemented method of claim 1, wherein:

the ground truth data is based on another set of state data with respect to the reference location using another sensor data taken by another set of sensors at the set of locations in the region;

the another set of sensors is associated with another sensor modality that is distinct form the particular sensor modality; and the another sensor modality has a highest sensor accuracy for the region.

4. The computer-implemented method of claim 1, wherein the ground truth data is obtained from a motion capture system.

5. The computer-implemented method of claim 1, wherein the categorizing step is performed by a logic-based filter with a maximum threshold, clustering, or a decision tree.

6. The computer-implemented method of claim 1, wherein the vehicle is a mobile robot or an automotive vehicle.

7. The computer-implemented method of claim 1, further comprising:

computing the first error range using Gaussian approximation, Bayesian inference, Monte Carlo simulations, or Residual analysis; and computing the second error range using Gaussian approximation, Bayesian inference, Monte Carlo simulations, or Residual analysis;

wherein the first error range and the second error range are quantified in units of distance.

8. The computer-implemented method of claim 1, further comprising:

training a machine learning model using the sensor data and the confident zone map such that the machine learning model is configured to generate the confident zone map as output upon receiving the sensor data as input.

9. A system comprising:

one or more processors;

an actuator in data communication with the one or more processors; and one or more memory in data communication with the one or more processors, the one of more memory having computer readable data stored thereon, the computer readable data including instructions that, when executed by the one or more processors, causes the one or more processors to perform a method that includes:

generating a set of state data with respect to a reference location using sensor data taken by a set of sensors at a set of locations in a region, the set of sensors including one or more sensors of a particular sensor modality, each state data including a corresponding position estimate of a vehicle carrying the set of sensors;

generating a set of contour ranges using the set of state data, each contour range being indicative of a respective error range of given state data with respect to corresponding ground truth data for a given location;

categorizing the region into a plurality of confident levels using the set of contour ranges, the plurality of confident levels including at least a first confident level associated with a first error range and a second confident level associated with a second error range, the first error range being greater than the second error range;

creating confident zones using the plurality of confident levels, the confident zones including at least a first confident zone corresponding to a first subset of locations associated with the first confident level and a second confident zone corresponding to a second subset of locations associated with the second confident level;

generating a confident zone map for the region, the confident zone map including at least the first confident zone and the second confident zone;

generating a unified confident zone map by fusing the confident zone map with one or more other confident zone maps associated with one or more other sensor modalities, the fusing including selecting a greatest confident level corresponding to a best sensor modality for a given location from among the confident zone map and the one or more other confident zone maps; and generating a control command based on the unified confident zone map, wherein the actuator is controlled based on the control command.

10. The system of claim 9, wherein the method further comprises:

receiving new sensor data from the set of sensors of the particular sensor modality; and updating mean and variance of the set of contour ranges using the new sensor data.

11. The system of claim 9, wherein:

the ground truth data is based on another set of state data with respect to the reference location using another sensor data taken by another set of sensors at the set of locations in the region;

the another set of sensors is associated with another sensor modality that is distinct form the particular sensor modality; and the another sensor modality has a highest sensor accuracy for the region.

12. The system of claim 9, wherein the ground truth data is obtained from a motion capture system.

13. The system of claim 9, wherein the method further comprises:

computing the first error range using Gaussian approximation, Bayesian inference, Monte Carlo simulations, or Residual analysis; and computing the second error range using Gaussian approximation, Bayesian inference, Monte Carlo simulations, or Residual analysis, wherein the first error range and the second error range are quantified in units of distance.

* * * * *